United States Patent
Hillen et al.

[19]

[11] Patent Number: 6,058,220
[45] Date of Patent: May 2, 2000

[54] DEVICE FOR SCANNING AN X-RAY IMAGE

[75] Inventors: Walter Hillen, Aachen; Stephan Rupp, Stolberg-Breinig; Ulrich Schiebel, Aachen, all of Germany

[73] Assignee: U.S. Philips Corporation, New York, N.Y.

[21] Appl. No.: 08/157,842

[22] Filed: Nov. 24, 1993

Related U.S. Application Data

[63] Continuation of application No. 07/661,037, Feb. 25, 1991, abandoned.

[30] Foreign Application Priority Data

Feb. 28, 1990 [DE] Germany ............................ 40 06 181

[51] Int. Cl.$^7$ .................................................. H04N 1/409
[52] U.S. Cl. .......................... 382/263; 382/264; 358/464; 358/463
[58] Field of Search ..................... 358/405, 463, 358/466, 474, 12, 31, 133, 465; 382/260, 263, 264; H04N 1/00, 1/40, 1/409

[56] References Cited

U.S. PATENT DOCUMENTS

| | | | |
|---|---|---|---|
| 4,677,461 | 6/1987 | Mizutani et al. . | |
| 4,706,113 | 11/1987 | Ito et al. | 358/166 |
| 4,752,944 | 6/1988 | Conrads et al. | 378/28 |
| 4,789,890 | 12/1988 | Itoh et al. | 358/31 |
| 4,825,297 | 4/1989 | Fuchsberger et al. | 358/166 |
| 4,908,697 | 3/1990 | Tsinberg et al. | 358/133 |
| 4,912,569 | 3/1990 | Petilli | 358/466 |
| 4,939,759 | 7/1990 | Rupp et al. . | |
| 4,954,885 | 9/1990 | Ito et al. | 358/31 |
| 4,999,701 | 3/1991 | Cavallerano et al. | 358/12 |
| 5,003,618 | 3/1991 | Meno | 382/54 |

OTHER PUBLICATIONS

IEEE International Conference on Acoustics, Speech, and Signal Processing, Proceedings, Mar. 26–29, 1985 pp. 684–687, Tao et al.

*Primary Examiner*—Kim Yen Vu
*Attorney, Agent, or Firm*—Dwight H. Renfrew

[57] ABSTRACT

A device for scanning an X-ray image where a previously locally uniformly charged photoconductor (1) is discharged in dependence on the local intensity, utilizing several electrometer probes which are arranged in a row and which line-wise scan the charge pattern of the photoconductor (1) which is successively displaced in the scanning direction, extending perpendicular to the line direction, the probes supplying, for each pixel, an image value which corresponds to a discharge at the relevant pixel. In order to eliminate streaky artefacts, the image values are applied to an analog-to-digital converter (5), the converted values being stored in an image memory (6), there being provided a signal processor (7) which subjects the image values of neighboring pixels in an image line to a low-pass filter function and which subjects the image values of pixels neighboring one another in the scanning direction to a high-pass filter function.

12 Claims, 1 Drawing Sheet

DEVICE FOR SCANNING AN X-RAY IMAGE

This is a continuation of application Ser. No. 07/661,037, filed Feb. 25, 1991.

FIELD OF THE INVENTION

The invention relates to a device for scanning a charge image which, during exposure to X-rays, is generated on a previously locally uniformly charged photoconductor as a function of the local intensity of the X-rays, using a plurality of electrometer probes which are arranged in a row and which line-wise scan the charge pattern of the photoconductor which is successively displaced in the scanning direction which extends perpendicularly to the line direction, the probes supplying for each pixel an image value which corresponds to the discharge at the relevant pixel.

Of interest are commonly owned copending applications Ser. No. 07/644,720 entitled "Method for the Measurement of X-rays or Gamma Rays, and Measuring Device Suitable for carrying out the Method" filed Jan. 23, 1991 in the name of W. Lumma, Ser. No. 07/644,713 and Ser. No. 07/644,712 both entitled "Sensor Matrix" and filed Jan. 23, 1991 in the name of Conrads et al. and Ser. No. 07/655,006 entitled "Device for scanning an X-ray Image" in the name of Hillen et al. filed Feb. 12, 1991.

BACKGROUND OF THE INVENTION

A device of this kind is known from DE-OS 35 29 108 which corresponds to U.S. Pat. No. 4,752,944 as well as from the references cited therein. The two-dimensional charge pattern which is generated on the surface of the photoconductor and which essentially corresponds to the spatial distribution of the X-ray intensity is scanned by an electrometer device. The electrometer device comprises a plurality of electrometer probes which are aligned in a row. During the scanning of the charge pattern, a first line of the charge pattern is first scanned. Subsequently, the photoconductor is displaced relative to the electrometer probes, in a scanning direction extending perpendicular to the row direction, over approximately the width of one line. Subsequently, the second line is scanned. This operation is repeated until the entire charge pattern of the photoconductor has been scanned. The electric signals generated during the scanning by the electrometer probes are amplified and are available for further signal processing.

In devices of this kind a problem is encountered in that the individual electrometer probes only rarely have the same sensitivity, so that the individual probes supply signals of different intensity. As a result, streaks occur in the image formed after complete scanning of the charge pattern. Similar problems occur due to differences in the distances between the electrometer probes and the photoconductor at the area of the various scanning lines. Exact displacement of the photoconductor relative to the electrometer probes so that an absolutely identical distance occurs between the electrometer probes and the surface of the photoconductor for all scanning lines is hardly feasible in practice, notably considering the size and the weight of such a photoconductor. These problems also give rise to streakiness of the image formed. Streaks can also be produced in the image due to low-frequency noise in amplifiers succeeding the probes.

SUMMARY OF THE INVENTION

It is an object of the invention to construct a device of the kind set forth in which the described problems are at least mitigated.

This object is achieved in accordance with the invention in that the image values are applied to an analog-to-digital converter, the converted values being stored in an image memory, there being provided a signal processor which subjects the image values of neighboring pixels of an image line to a low-pass filter function, and which subjects the image values of pixels which neighbor one another in the scanning direction to a high-pass filter function.

The digitized image values are stored in an image memory. After all image values have been stored, the image values of the individual pixels are processed by a signal processor.

The described streakiness always occurs in a direction perpendicular to the line direction, i.e. the scanning direction. This streakiness in the scanning direction is eliminated in that a signal processor processes the image values of the pixels, stored in the image memory, so that neighboring pixels of an image line are subjected to a low-pass filter function, the image values of pixels which neighbor one another in the scanning direction being subjected to a high-pass filter function. This procedure suitably eliminates streakiness in the image, because streakiness in the scanning direction implies a low frequency component which is caused by deviating probe sensitivities or similar phenomena and which should be eliminated as much as possible. This can be achieved by the described filter function locally performed.

In principle the two filter functions also inherently influence the useful signal of the image. However, because X-ray images for medical applications contain a minimum of extensive fine structures which extend exactly and exclusively in the line or scanning direction, little relevant image information is lost. Moreover, the design of the filter should be adapted to the relevant field of application in order to minimize the influencing of important image information.

In one version of the invention, the filter functions are realized by means of the signal processor and a second image memory in that the signal values stored in the first image memory are subjected to a high-pass filter function in the line direction by means of the signal processor and are buffered in the second image memory, in that the buffered values are subjected to a low-pass filter function in the scanning direction by the signal processor and are buffered again in the second image memory, and in that after calculation of all values the values buffered in the second image memory are subtracted from the values stored in the first image memory.

The original image values initially stored in the first image memory are processed by the signal processor so that image values of neighboring pixels of an image line are subjected to a high-pass filter function. The image values thus obtained are buffered in the second image memory. Using the values buffered in the second image memory, the image values of pixels which neighbor one another in the scanning direction are subjected to a low-pass filter function. The values thus obtained are again buffered in the second image memory, the previously buffered values being erased. Finally, the values stored in the second image memory after execution of the low-pass filtering operation are subtracted from the original values stored in the first image memory.

Thus, according to this method the high-pass filter function is realized by means of a low-pass filter function and vice versa. This is possible because, for example for the realization of a high-pass filter function, first a low-pass filter function can be performed, after which the values thus formed are subtracted from the original values. As a result, a high-pass filter function is obtained. In the device in accordance with the invention, two functions are successively executed, the new values thus calculated being buffered. The values thus calculated are subtracted from the original values only after execution of both functions.

The sequence in which the filtering operations are performed is actually irrelevant; thus, in accordance with one version, first the filtering operation is performed in the scanning direction, followed by the filtering operation in the line direction.

The advantage of this approach is that correction is effected without complex calculations.

In a further version of the invention, the values stored in the second image memory are multiplied by a scaling factor, using the signal processor, prior to subtraction from the image values stored in the first image memory, the scaling factor serving for adjustment of the filtering effect.

The degree of filtering as described above can be adjusted by means of a scaling factor, that depends on the purpose or the streakiness of the image scanned. This is preferably performed in that the image values stored in the second image memory are subjected to a scaling factor prior to subtraction from the values stored in the first image memory, which scaling factor is capable of reducing said values to any desired extent, thus enabling adjustment of the filtering effect.

In a further version of the invention, the magnitude of the scaling factor is chosen as a function of the image amplitude represented by the image values so that it is comparatively small in highly exposed image areas.

In order to minimize the negative effects of filtering on notably relevant image values which usually have a comparatively high signal level, the scaling factor is preferably chosen in dependence on the magnitude of the image values, i.e. the image amplitude. Filtering is then reduced as the image amplitude increases.

In a further version of the invention, the magnitude of the scaling factor is chosen in dependence on the signal variation in the vicinity of an image value so that the scaling factor is comparatively small at the area of strong signal gradients.

Because signal gradients should be affected as little as possible by the filtering operation, the scaling factor can also be chosen in dependence on the signal variation. To this end, the variation of the signal is studied for several adjacently situated pixels. If a signal gradient occurs in the pixel zone to be calculated, the scaling factor can be chosen to be small in this zone so that the influencing of the signal gradient is minimized.

In a further version of the invention, the filter functions are realized using two one-dimensional filter functions. The locally executed filter functions per se represent a two-dimensional filtering operation. However, in order to minimize technical complexity, the filtering operations are preferably performed using two one-dimensional filter functions which can be readily realised.

IN THE DRAWING

An embodiment in accordance with the invention will be described in detail hereinafter with reference to the drawing. Therein:

DESCRIPTION OF THE PREFERRED EMBODIMENT

Figure 1:
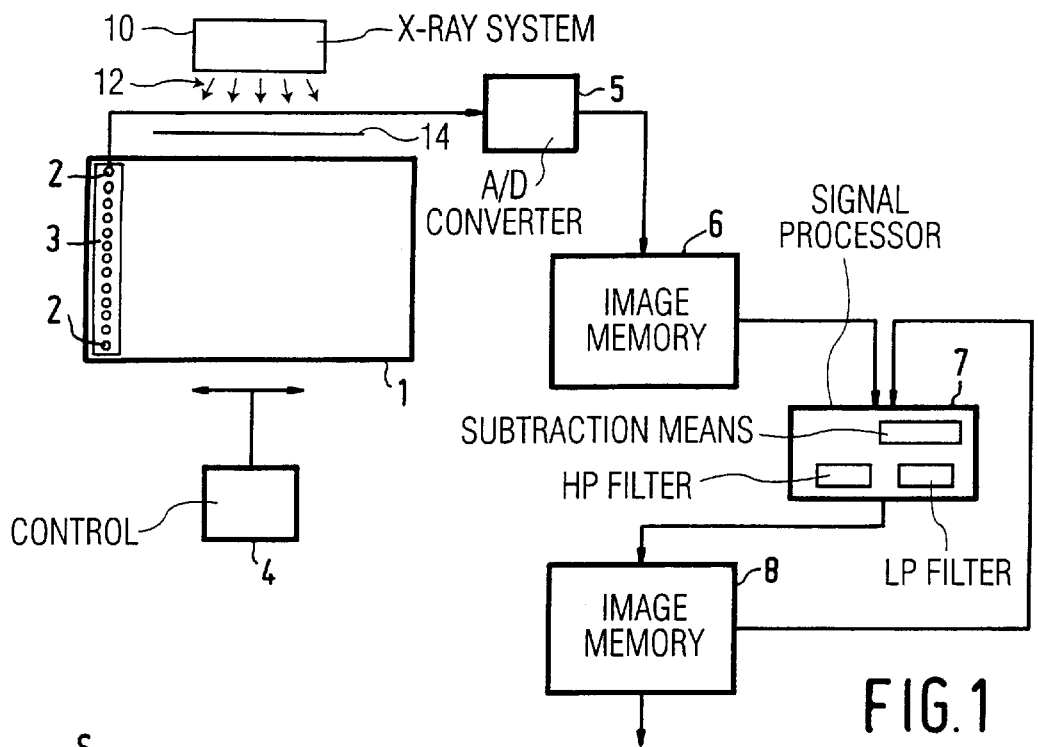
FIG. 1 shows a block diagram of a device in accordance with the invention.

A device as diagrammatically shown in FIG. 1 comprises a photoconductor 1 which has been uniformly charged (by means not shown in the Figure) prior to an X-ray exposure of an object 14 by X-ray system 10 and which is discharged during an X-ray exposure in dependence on the intensity of the X-rays 12 passed by object 14. In practice, the rays 12 and object 14 are positioned over the photoconductor 1, the side-by-side schematic representation being only for simplicity of illustration. Following this operation, the surface of the photoconductor is locally differently discharged so that it contains a charge pattern.

This charge pattern is scanned by means of a plurality of electrometer probes 2. A multitude of electrometer probes are provided, which probes are aligned in a row on a support 3 which is merely indicated in the Figure. When the photoconductor 1 is scanned, first one line of the charge pattern is scanned, i.e. all signals supplied by the probes 2 are read. This is referred to hereinafter as the line direction. Subsequently, the photoconductor 1 is displaced, using a device which is not shown in the Figures and which is controlled by a control unit 4, relative to the probes 2 over approximately the width of one scanning line in the scanning direction. This displacement thus takes place perpendicular to the line direction which extends parallel to the support 3 for the probes 2. This is referred to hereinafter as the scan direction. After displacement of the photoconductor relative to the probes, another line of the charge pattern present on the photoconductor 1 is scanned by the electrometer probes 2. This procedure is repeated until the entire charge pattern has been scanned.

The signals of the probes 2, read during the scanning operation, may be first amplified (by means not shown) and then applied to an A/D converter 5. The data thus digitized is written into an image memory 6. After complete scanning of the charge pattern of the photoconductor 1, the image values of all pixels are present in the image memory 6. Should, for example one of the probes 2 have a sensitivity which deviates from that of the other probes, the signals supplied by the relevant probe would be higher or lower in value than the signals supplied by the other probes. Ultimately this means that streakiness occurs in the scanning direction, i.e. transverse of the line direction, in an image formed by reading the signals stored in the image memory 6.

Such streakiness, however, could also be caused, for example by a difference in distance between the various probes and the photoconductor 1 or by low-frequency fluctuations (noise) of the probe signals.

This streakiness can be at least mitigated in that the image values of neighboring pixels of an image in the line direction are subjected to a low-pass filter function. The image values of pixels neighboring one another in the scanning direction, however, are subjected to a high-pass filter function. The high-pass filter function is realized by way of a low-pass filter function employing a subtraction of low-passed signals from the original digitized signals. Conversely, the low-pass filter function is realized by subtraction of high-pass filtered image values from the original digitized signals. The high-pass filtering operation to be executed on image values of neighboring pixels in the scanning direction is performed by a low-pass filtering operation followed by subtraction performed by the signal processor 7. The image values thus obtained by the low-pass filtering in the scan direction are buffered in a second image memory 8. Subsequently, image values of pixels which neighbor one another in an image line are high-pass filtered and stored in second memory 8. The last high-pass filter operation is performed on the image values that were previously low-pass filtered in the scanning direction. The newly calculated image values thus obtained, being stored in the second image memory 8, are subtracted, using the signal processor 7, from the original digitized image values stored in the first image memory 6. The new image values obtained through subtraction represent the filtered image values and are stored in the second image memory 8 wherefrom they can be fetched for further processing or display, for example on a monitor.

The described locally executed filtering operation can be mathematically expressed as follows.

When the image values present in a matrix before filtering are denoted as S(z, a), where z denotes position frequencies in the line direction and a denotes position frequencies in the scanning direction, the filtered image values S'(z, a) can be described as follows:

$$S'(z,a)=S(z,a)-G(k)*F_s(z,a)*S(z,a).$$

In this equation, $F_s(z, a)$ is the filter function and G(k) is the scaling factor. The filter function $F_s(z, a)$ can be described as follows:

$$F_s(z,a)=F_H(z)*F_T(a).$$

This indicates that the image values which neighbor one another in the line direction are subjected to a high-pass filter function and that in the scanning direction, extending perpendicular to the line direction, they are subjected to a low-pass filter function. Such two-dimensional filtering can be performed using two one-dimensional filtering operations.

Figure 2:
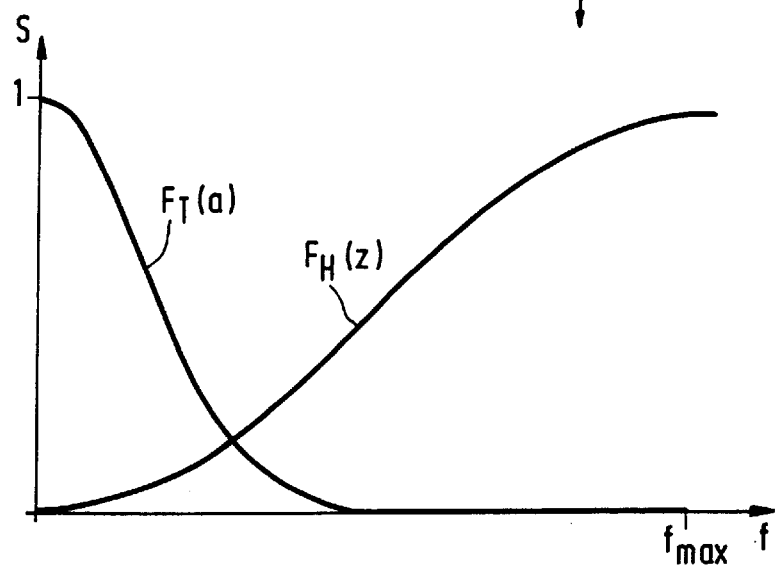
FIG. 2 shows a diagram for two one-dimensional filter functions.
Figure 3:
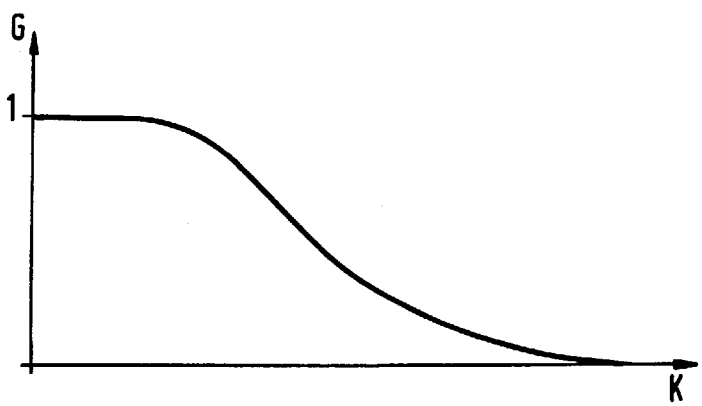
FIG. 3 shows a diagram illustrating the choice of the scaling factor as a function of the image amplitude.

FIG. 2 shows two of such one-dimensional filter functions by way of example. In the present example, both filter functions are chosen so that they either do not influence or completely suppress the image values S in the extreme cases. The choice of these filter functions depends on many parameters, for example on the photoconductor used, the probes, the distance between the probes and the photoconductor, the desired revolution etc, so that no generally applicable choice can be prescribed. It appears from FIG. 2, however, that pixels which neighbor one another in the line direction are subjected to a high-pass filter function and that pixels which neighbor one another in the scanning direction are subjected to a low-pass filter function. The values produced by these filtering operations are subtracted from the initial values, so that ultimately exactly the opposite filtering occurs, i.e. low-pass filtering occurs in the line direction and high-pass filtering occurs in the scanning direction which extends perpendicularly to the line direction.

The filter values subtracted from the originally determined image values, being stored in the first image memory 6 of FIG. 1, moreover, are subject to a scaling factor G(k) whereby the degree of filtering can be influenced.

The scaling factor G(k) can be chosen in various ways. When the scaling factor is defined as:

$$G(k)=1-k,$$

k can be chosen in various ways. For example, when the scaling factor is to be chosen in dependence on the image amplitude:

$$k = \frac{k(z, a)}{k_{max}}$$

Therein, $k_{max}$ is the maximum image amplitude. In this case the factor k increases as the image amplitude increases, so that the scaling factor G(k) decreases as the image amplitude increases, with the result that the filter values subtracted from the original image values also decrease, so that ultimately the filter effect is reduced.

For the choice of the scaling factor, however, it is also possible to take into account not only the image brightness, but also the variation of the signal at the area of the pixels whose image values are calculated. For example, if a signal gradient occurs in the pixel zone to be calculated, this gradient should be affected as little as possible. This can be taken into account by choosing k as follows:

$$k_1=a*(S(z,a)-S(z+d,a))$$

where the factor a serves for evaluating the gradient amplitude, represented by the difference, and where d takes into account the pixel distance in the line direction in which the gradient amplitude is to be taken into account.

For taking into account the gradient amplitude, moreover, a kind of "memorization" can be taken into account, i.e. an aftereffect of contrast gradients on their surroundings. This can be realised in that the previously determined value of $k_1$ is again taken into account for the next value, a factor b expressing the weight of this repeat. The following equation is then obtained:

$$k_2=a*(S(z,a)-S(z+d,a))+b*k_2.$$

When k is chosen in this way, a current gradient amplitude as well as a previously determined gradient amplitude in the neighboring zone d are taken into account. It is thus achieved that the filter effect is reduced at the area of comparatively strong signal variations and that at the area of only slight signal variations a comparatively high filter effect occurs. Thus, image artefacts are particularly well suppressed at areas which very likely do not produce a signal.

What is claimed is:

1. A device for scanning a charge image produced along the surface of a previously locally uniformly charged photoconductor by an exposure of said photoconductor to X-ray radiation, said device comprising:

a plurality of electrometer probes arranged in a row in a direction for positioning relative to the surface of the photoconductor to provide from the respective probes, output signal values of respective pixels of the charge image on the photoconductor along a current position of said row;

means for successively displacing the current position of said row relative to the surface of the semiconductor in a direction perpendicular to the direction of the row;

analog-to-digital converter means for digitizing said output signal values of the pixels of said charge image;

first memory means for storing said digitized output signal values, said stored digitized values corresponding to a first image, said probes causing streaks in the first image directed in the direction; perpendicular to the direction of the row, and spatial filtering means responsive to said stored digitized values in said first memory corresponding to said first image for forming an output image in which said streaks are attenuated by filtering spatial frequencies of said first image in such a manner that any parts of said first image containing high frequencies in the direction of the row and low frequencies in the direction perpendicular to the direction of the row are attenuated.

2. A device for scanning a charge image produced along the surface of a previously locally uniformly charged photoconductor by an exposure of said photoconductor to X-ray radiation, said device comprising:

a plurality of electrometer probes arranged in a row in a direction for positioning relative to the surface of the photoconductor to provide from the respective probes, output signal values of respective pixels of the charge image on the photoconductor along a current position of said row;

means for successively displacing the current position of said row relative to the surface of the semiconductor in a direction perpendicular to the direction of the row;

analog-to-digital converter means for digitizing said output signal values of the pixels of said charge image;

first memory means for storing said digitized output signal values, said stored digitized values corresponding to a first image, said probes causing streaks in the first image directed in the direction perpendicular to the direction of the row; and spatial filtering means responsive to said stored digitized values in said first memory corresponding to said first image for forming an output image in which said streaks are attenuated by filtering spatial frequencies of said first image in such a manner that any parts of said first image containing high frequencies in the direction of the row and low frequencies in the direction perpendicular to the direction of the row are attenuated, wherein said spatial filtering means comprises a signal processing means for successively performing first and second one-dimensional filtering operations, one of said first and second operations being high-pass filtering in the direction of the row and the other of said first and second operations being low-pass filtering in the direction perpendicular to the direction of the row, and second memory means for receiving and buffering first signal values from said signal processing means resulting from performance of the first operation, and supplying said first signal values to said signal processing means for performing said second operation on said first signal values to derive second signal values, wherein said second signal values are supplied by said signal processing means to, and buffered by, said second memory means, and said signal processing means further comprises means for subtracting from the signal values stored in the first memory, third signal values derived from said second signal values.

3. A device as claimed in claim 2, wherein the signal processing means further comprises means for deriving said third image signal values by multiplying said second signal values by a scaling factor.

4. A device as claimed in claim 3, wherein the signal processing means comprises means for locally adapting the scaling factor dependant upon local conditions in the first image.

5. A device as claimed in claim 4, wherein the scaling factor is relatively small in relatively high exposed areas and relatively large in relatively low exposed areas of the first image.

6. A device as claimed in claim 4, wherein the scaling factor is relatively small in areas of relatively large gradients and relatively large in areas of relatively weak gradients in the first image.

7. In an X-ray examination apparatus including a device for scanning a local charge image produced along the surface of a previously locally uniformly charged photoconductor by an exposure of said photoconductor to X-ray radiation, the combination comprising:

an X-ray source for irradiating said photoconductor with X-rays via an object to be examined to produce said local charge image on the surface of said photoconductor;

a plurality of electrometer probes arranged in a row in a direction for positioning relative to the surface of the photoconductor to provide from the respective probes, output signal values of respective pixels of the charge image on the photoconductor along a current position of said row;

means for successively displacing the current position of said row relative to the surface of the semiconductor in a direction perpendicular to the direction of the row;

analog-to-digital converter means for digitizing said output signal values of the pixels of said charge image;

first memory means for storing said digitized output signal values, said stored digitized values corresponding to a first image, said probes being subject to variation in sensitivity from one to another which causes streaks in the first image directed in the direction perpendicular to the direction of the row; and spatial filtering means responsive to said stored digitized values in said first memory corresponding to said first image for forming an output image in which said streaks are attenuated by filtering spatial frequencies of said first image in such a manner that any parts of said first image containing high frequencies in the direction of the row and low frequencies in the direction perpendicular to the direction of the row are attenuated.

8. An X-ray examination device comprising:

an X-ray source for irradiating a previously locally uniformly charged photoconductor with X-rays via an object to be examined to produce a local charge image on the surface of said photoconductor;

a plurality of electrometer probes arranged in a row in a direction for positioning relative to the surface of the photoconductor to provide from the respective probes, output signal values of respective pixels of the charge image on the photoconductor along a current position of said row;

means for successively displacing the current position of said row relative to the surface of the semiconductor in a direction perpendicular to the direction of the row;

analog-to-digital converter means for digitizing said output signal values of the pixels of said charge image;

first memory means for storing said digitized output signal values, said stored digitized values corresponding to a first image, said probes being subject to variation in sensitivity from one to another which causes streaks in the first image directed in the direction perpendicular to the direction of the row; and spatial filtering means responsive to said stored digitized values in said first memory corresponding to said first image for forming an output image in which said streaks are attenuated by filtering spatial frequencies of said first image in such a manner that any parts of said first image containing high frequencies in the direction of the row and low frequencies in the direction perpendicular to the direction of the row are attenuated, wherein said spatial filtering means comprises a signal processing means for successively performing first and second one-dimensional filtering operations, one of said first and second operations being high-pass filtering in the direction of the row and the other of said first and second operations being low-pass filtering in the direction perpendicular to the direction of the row, and second memory means for receiving and buffering first signal values from said signal processing means resulting from performance of the first operation, and supplying said first signal values to said signal processing means for performing said second operation on said first signal values to derive second signal values, and wherein said second signal values are supplied by said signal processing means to, and buffered by, said second memory means, and said signal processing means further comprises means for subtracting from the signal values stored in the first memory, third signal values derived from said second signal values.

9. A device as claimed in claim 8, wherein the signal processing means further comprises means for deriving said third image signal values by multiplying said second signal values by a scaling factor.

10. A device as claimed in claim 9, wherein the signal processing means comprises means for locally adapting the scaling factor dependant upon local conditions in the first image.

11. A device as claimed in claim 10, wherein the scaling factor is relatively small in relatively high exposed areas and relatively large in relatively low exposed areas of the first image.

12. A device as claimed in claim 10, wherein the scaling factor is relatively small in areas of relatively large gradients and relatively large in areas of relatively weak gradients in the first image.

* * * * *